US009522357B2

(12) United States Patent
Kwok et al.

(10) Patent No.: US 9,522,357 B2
(45) Date of Patent: Dec. 20, 2016

(54) FILTRATION MEDIA FIBER STRUCTURE AND METHOD OF MAKING SAME

(71) Applicants: Products Unlimited, Inc., Omaha, NE (US); LMS Technologies, Inc., Bloomington, MN (US)

(72) Inventors: Kui-Chiu Kwok, Bloomington, MN (US); Al Vatine, Bloomington, MN (US); Scott B. Beier, Omaha, NE (US); Gary Pospisal, Omaha, NE (US)

(73) Assignees: Products Unlimited, Inc., Omaha, NE (US); LMS Technologies, Inc., Bloomington, MN (US)

( * ) Notice: Subject to any disclaimer, the term of this patent is extended or adjusted under 35 U.S.C. 154(b) by 280 days.

(21) Appl. No.: 14/075,635

(22) Filed: Nov. 8, 2013

(65) Prior Publication Data
US 2014/0260990 A1 Sep. 18, 2014

Related U.S. Application Data

(60) Provisional application No. 61/789,309, filed on Mar. 15, 2013.

(51) Int. Cl.
| | |
|---|---|
| *B01D 46/54* | (2006.01) |
| *B01D 46/00* | (2006.01) |
| *B05D 5/00* | (2006.01) |
| *B01D 39/20* | (2006.01) |
| *B01D 39/16* | (2006.01) |

(52) U.S. Cl.
CPC ........... *B01D 46/546* (2013.01); *B01D 39/163* (2013.01); *B01D 39/2017* (2013.01); *B01D 39/2041* (2013.01); *B01D 39/2082* (2013.01); *B01D 46/0036* (2013.01); *B05D 5/00* (2013.01); *B01D 2239/025* (2013.01); *B01D 2239/0407* (2013.01); *B01D 2239/0421* (2013.01); *B01D 2239/0428* (2013.01); *B01D 2239/064* (2013.01); *B01D 2239/10* (2013.01); *B01D 2239/1225* (2013.01); *B01D 2239/1233* (2013.01); *Y10T 428/2922* (2015.01)

(58) Field of Classification Search
CPC .............. B01D 46/546; B01D 46/0036; B01D 39/2082; B01D 39/2041; B01D 39/163; B01D 39/2017; B01D 2239/025; B01D 2239/064; B01D 2239/0428; B01D 2239/0407; B01D 2239/10; B01D 2239/1225; B01D 2239/1233; B01D 2239/0421; B05D 5/00; Y10T 428/2922
See application file for complete search history.

(56) References Cited

U.S. PATENT DOCUMENTS

| | | | | | |
|---|---|---|---|---|---|
| 3,353,682 | A | * | 11/1967 | Pall | B01D 39/1607 |
| | | | | | 162/131 |
| 3,475,527 | A | * | 10/1969 | Chapman | D01D 1/106 |
| | | | | | 264/169 |
| 3,476,635 | A | * | 11/1969 | Heh | D04H 3/02 |
| | | | | | 156/174 |

(Continued)

FOREIGN PATENT DOCUMENTS

WO    2011133394    10/2011

*Primary Examiner* — Amber R Orlando
*Assistant Examiner* — Britanny Precht
(74) *Attorney, Agent, or Firm* — Advent, LLP

(57) ABSTRACT

Fiber structures and methods are described that incorporate a body of a micron fiber modified by the attachment of discrete length, crimped nano-fibers. Numerous of these modified fiber structures can be assembled into air filter media. Further augmentations of the modified fibers and media can be implemented to improve filtration characteristics.

21 Claims, 12 Drawing Sheets

(56) References Cited

U.S. PATENT DOCUMENTS

| | | | | |
|---|---|---|---|---|
| 4,904,343 A * | 2/1990 | Giglia | | A62D 5/00 162/145 |
| 5,221,573 A * | 6/1993 | Baigas, Jr. | | |
| 5,330,638 A * | 7/1994 | Burklund | | A47J 37/1223 210/108 |
| 5,376,278 A * | 12/1994 | Salem | | B01J 47/126 210/193 |
| 5,641,343 A * | 6/1997 | Frey | | B01D 46/0004 55/320 |
| 5,674,339 A * | 10/1997 | Groeger | | A62D 5/00 156/145 |
| 6,838,005 B2 | 1/2005 | Tepper et al. | | |
| 6,998,009 B2 * | 2/2006 | Janney | | B01D 46/0028 156/283 |
| 7,390,760 B1 * | 6/2008 | Chen | | A61F 13/514 442/340 |
| 8,366,797 B2 | 2/2013 | Chung et al. | | |
| 2003/0073370 A1 * | 4/2003 | Strommen | | B01J 20/20 442/417 |
| 2003/0148097 A1 * | 8/2003 | Takikawa | | B82Y 30/00 428/364 |
| 2003/0168401 A1 * | 9/2003 | Koslow | | A01N 25/26 210/500.25 |
| 2004/0038013 A1 * | 2/2004 | Schaefer | | B01D 39/1623 428/220 |
| 2004/0211160 A1 * | 10/2004 | Rammig | | A47L 9/12 55/382 |
| 2004/0253371 A1 * | 12/2004 | Janney | | B01D 46/0028 427/180 |
| 2005/0026526 A1 * | 2/2005 | Verdegan | | B01D 39/16 442/340 |
| 2006/0068668 A1 * | 3/2006 | Kameoka | | B01D 39/163 442/340 |
| 2007/0175196 A1 * | 8/2007 | Tepper | | B01J 20/08 55/527 |
| 2008/0020193 A1 * | 1/2008 | Jang | | B29C 70/025 428/292.1 |
| 2008/0072551 A1 * | 3/2008 | Zuberi | | B01D 39/2082 55/385.1 |
| 2008/0264259 A1 * | 10/2008 | Leung | | B01D 39/1623 96/143 |
| 2009/0266759 A1 * | 10/2009 | Green | | B01D 39/163 210/489 |
| 2010/0122515 A1 * | 5/2010 | Kuo | | B01D 39/2065 55/524 |

* cited by examiner

FIG. 10

FILTRATION MEDIA FIBER STRUCTURE AND METHOD OF MAKING SAME

CROSS REFERENCE TO RELATED APPLICATIONS

The present application claims the benefit under 35 U.S.C. §119(e) of U.S. Provisional Application Ser. No. 61/789,309, filed Mar. 15, 2013, entitled HIGH LOFT FIBER STRUCTURE AND METHOD OF MAKING SAME. U.S. Provisional Application Ser. No. 61/789,309 is hereby incorporated by reference in its entirety.

BACKGROUND

Filtration systems are utilized in industrial, commercial, and residential settings for the physical separation of components of a fluid stream from other components of the fluid stream. The fluid streams may comprise gaseous or liquid carrier fluids in which components to be filtered are transported. Filtration systems may employ filters to physically remove the components to be filtered via impingement, interception, diffusion, straining and the like.

SUMMARY

Filtration devices and methods are described that employ micron-sized fibers as a support body for smaller diameter nano-fibers attached thereto. In one or more implementations, the nano-fibers have a crimped body structure and have a discrete length. For instance, when these crimped nano-fibers having discrete length are attached to the micron fiber they entangle among themselves and also with, onto, and around, the micron fiber to form a modified fiber. Numerous of these modified fibers are configured for assembly into air filter media.

This Summary is provided to introduce a selection of concepts in a simplified form that are further described below in the Detailed Description. This Summary is not intended to identify key or essential aspects of the claimed subject matter. Moreover, this Summary is not intended for use as an aid in determining the scope of the claimed subject matter.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 10:
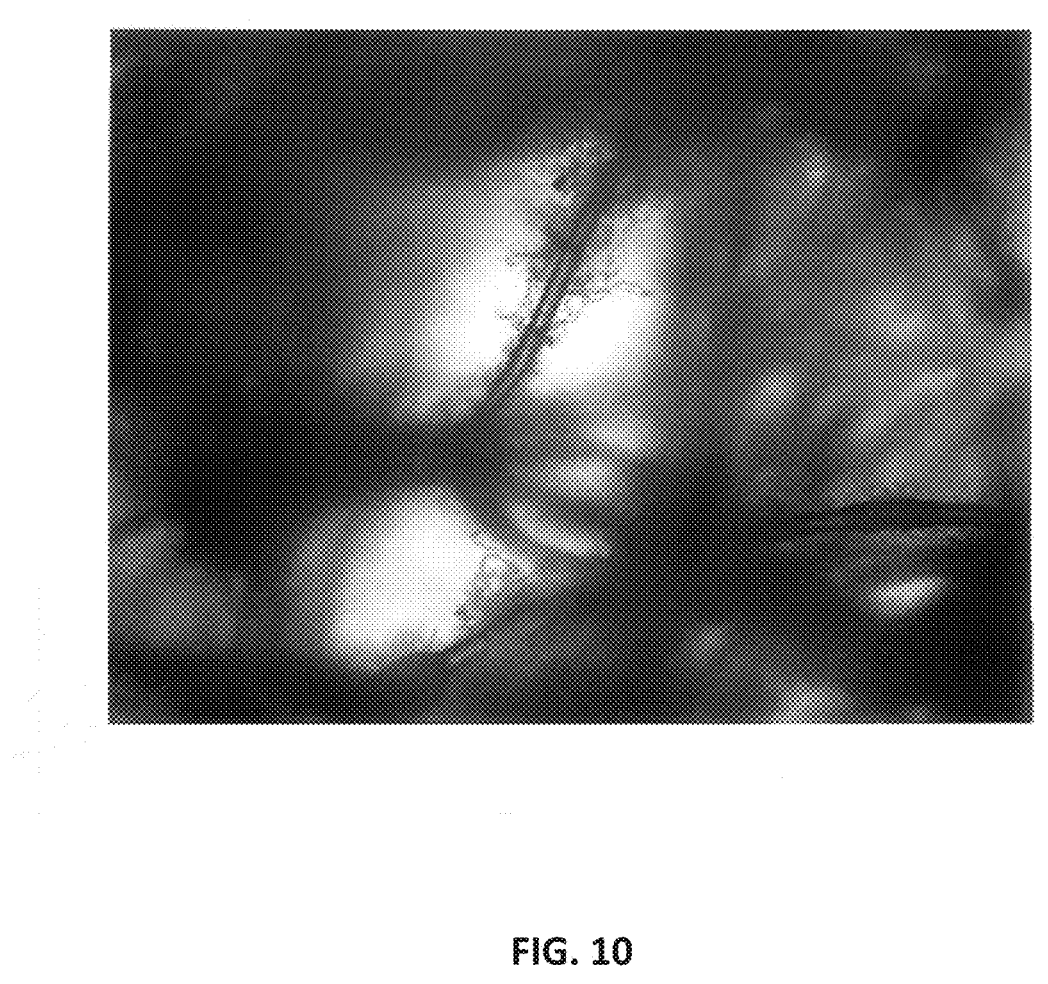

FIG. 10 is a microscopic photograph of a media fiber structure at a focal depth in accordance with an implementation of the present disclosure.

DETAILED DESCRIPTION

Overview

Figure 1:
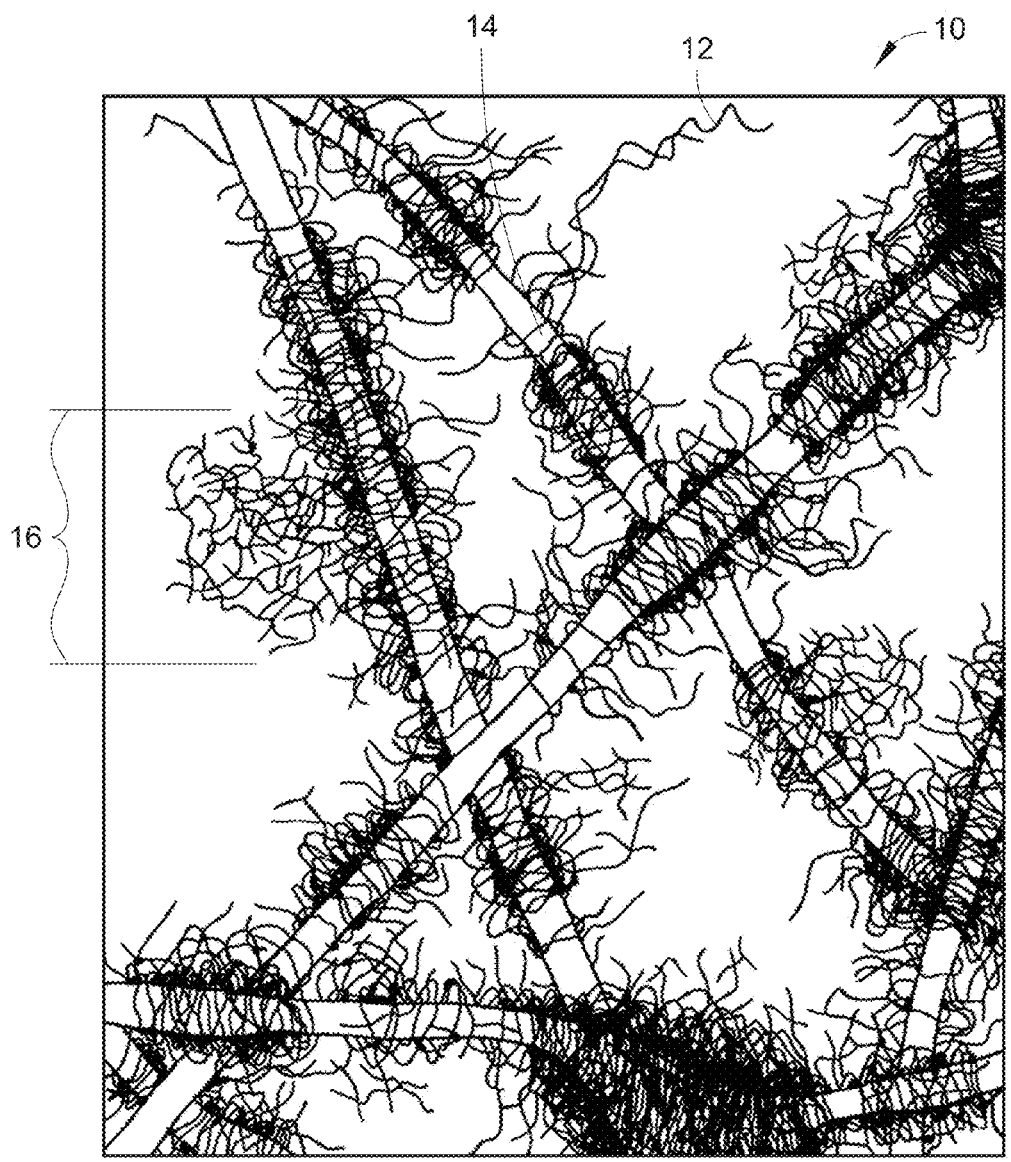
FIG. 1 is a drawing of a microscopic photo of a media fiber structure in accordance with an implementation of the present disclosure wherein the nano-fibers are attached to micron fibers.

Filtration systems utilize filtration media for the physical separation of components of a fluid stream from other components of the fluid stream. Filtration systems may employ air filtration media including relatively large fibers having a diameter measureable in micrometers ("micron fibers") and comparatively smaller fibers having a diameter measureable in nanometers ("nano-fibers") in an attempt to achieve improved filtration efficiency (e.g., the ability to capture more and smaller particles). The filtration structure may be configured to increase the surface area within a media for capturing particles by reducing the fiber size. For example, the micron fibers can support webs of nano-fibers that can be produced directly onto the surface of preexisting fibrous substrates consisting of larger micron fibers, or layers of nano-fibers can be placed between layers of micron fiber media. Such configurations can employ nano-fibers that can be: a) extremely long, relatively continuous and although flexible and readily bent, they are for all intents and purposes, one dimensional (i.e., straight), having significant length as compared to their width or diameter, or b) short and very straight. These configurations pose significant challenges to filtration efficiency, such as being thin and non-resilient, being restrictive to fluid flow (e.g., susceptible to pressure drop), having increased surface loading, having reduced design flexibility (e.g., requiring upstream side positioning of nano-fiber structure), utilizing design structures that have increased material (e.g., pleated structures), having a tendency to align in compact formations, and the like.

Accordingly, filtration devices and methods are described that employ micron fibers as a support body for smaller diameter nano-fibers attached thereto. The nano-fibers can have a crimped body structure with a discrete length. For instance, when these crimped nano-fibers having discrete length are attached to the micron fiber they entangle among themselves and also with, onto, and around, the micron fiber with firm attachment to form a modified fiber. In an implementation, the attachment of the nano-fibers to the micron fibers is accomplished via adhesion between the micron fibers and the nano-fibers. In an implementation, the attachment of the nano-fibers to the micron fibers is accomplished via electrostatic charge attraction and/or Van der Waals force attraction between the micron fibers and the nano-fibers. In an implementation, the attachment of the nano-fibers to the micron fibers is accomplished via mechanical entanglement of the nano-fibers onto and about the micron fibers. Numerous of these modified fibers (e.g., the attached nano-fibers and micron fibers) are configured for assembly into air filter media.

The modified fiber structures described herein may be configured to form numerous micro-volumes, which may be smaller than pores formed solely by micron fibers, and which may maintain an open configuration, such as by resisting compaction. In an implementation, the crimped nano-fibers are distributed three-dimensionally in space relative to the supporting micron fiber (e.g., upstream and downstream distribution), which may increase fiber surface area and micro-volumes. The three-dimensional distribution also provides resistance against complete blockage of a particular portion of the filter media, such that a portion of fluid (e.g., air and/or other gases) can pass through the filter.

Embodiments are described more fully below with reference to the accompanying figures, which form a part hereof and show, by way of illustration, specific exemplary embodiments. These embodiments are disclosed in sufficient detail to enable those skilled in the art to practice the disclosure. However, embodiments may be implemented in many different forms and should not be construed as being limited to the embodiments set forth herein. The following detailed description is, therefore, not to be taken in a limiting sense in that the scope of the present disclosure is defined only by the appended claims.

For the purpose of improved communication and understanding the following definitions will be applicable to this writing:

"Fiber" is a flexible, threadlike object having a length at least 100 times its cross-sectional diameter in the case of a round fiber or 100 times its maximum cross-sectional dimension in the case of a non-round fiber.

Figure 3:
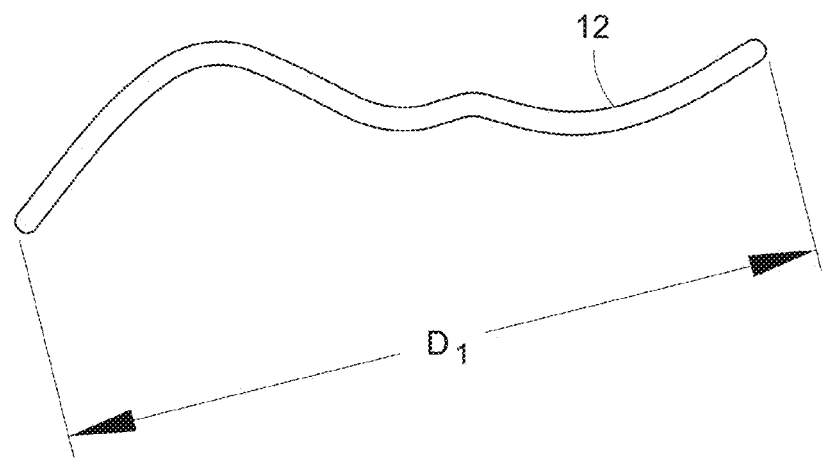
FIG. 3 is an enlarged drawing of a typical discrete length crimped fiber in a relaxed and natural state explaining the defined measurement of "Crimped Length."

"Crimp" is the wavy, bent, curled, curved, coiled, saw-tooth or similar shape of a fiber as it presents itself in a natural, relaxed and unrestrained condition. FIG. 3 provides a pictorial representation of a crimped nano-fiber.

"Crimped Length" is the length, measured in a straight line, from one end of a fiber to the other end of the same fiber when the fiber is measured in a natural, relaxed and unrestrained condition. FIG. 3 provides a pictorial representation of the crimped length ($D_1$) of a crimped nano-fiber.

Figure 4:
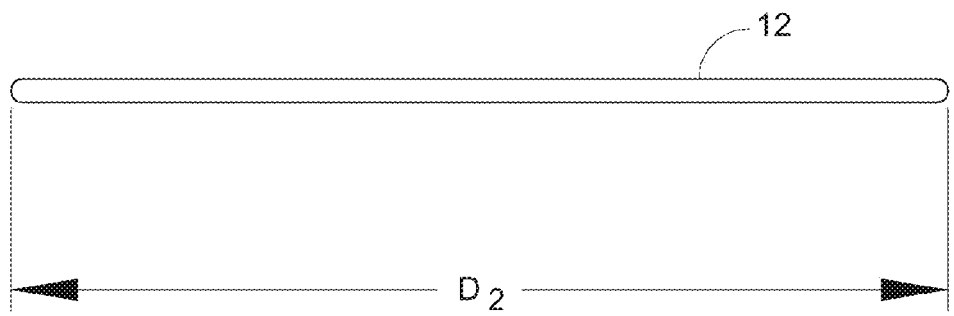
FIG. 4 is an enlarged drawing of the typical discrete length crimped fiber of FIG. 3 under sufficient tensile load to straighten the fiber thereby explaining the defined measurement of "Straightened Length."
Figure 5:
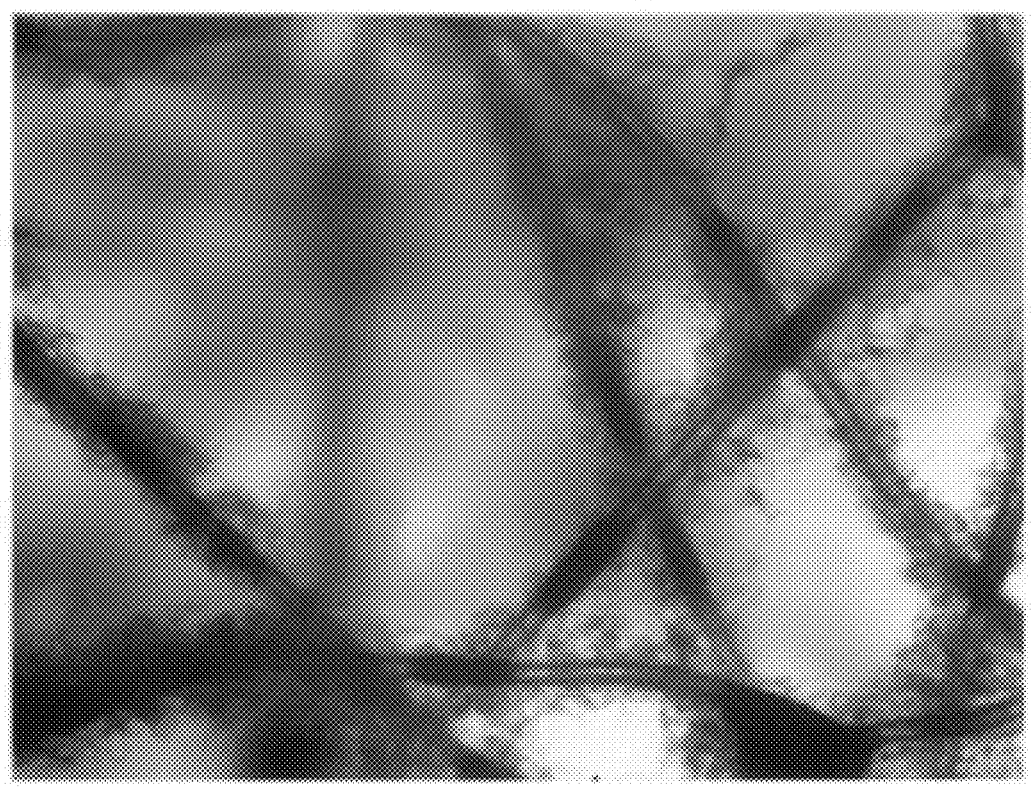
FIG. 5 is a microscopic photograph of a media fiber structure at a focal depth in accordance with an implementation of the present disclosure.
Figure 6:
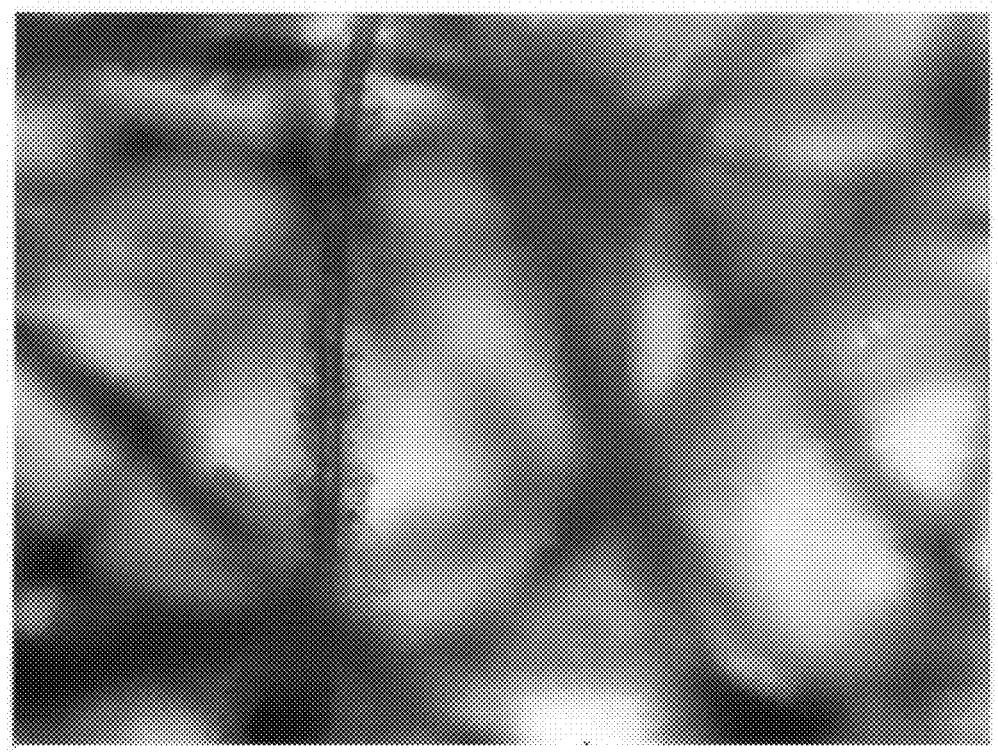
FIG. 6 is a microscopic photograph of a media fiber structure at a focal depth in accordance with an implementation of the present disclosure.
Figure 7:
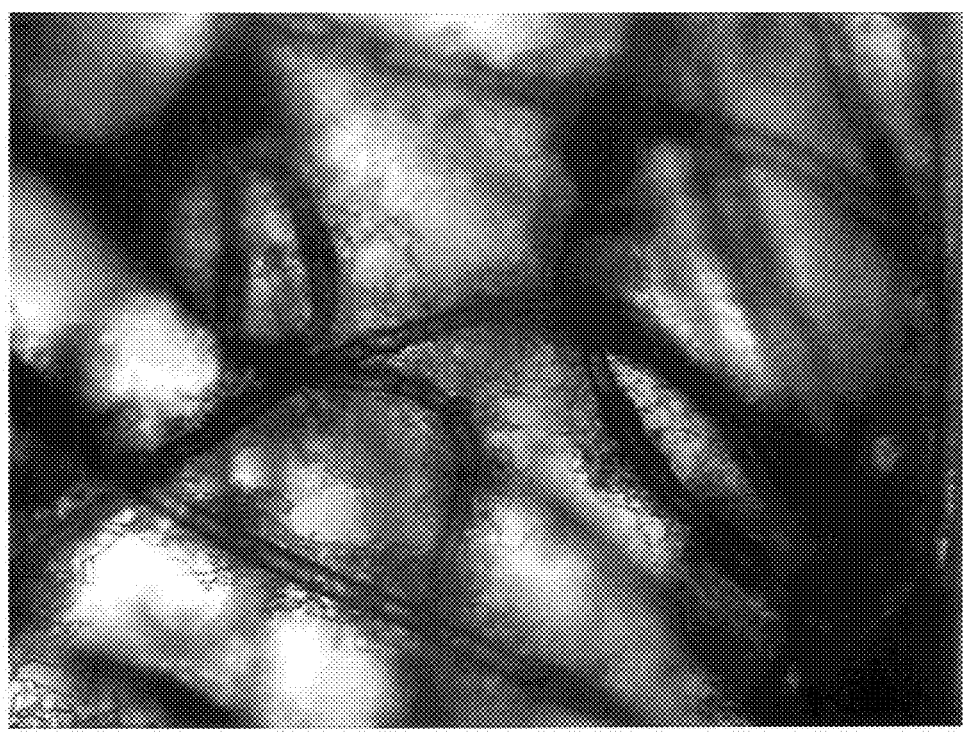
FIG. 7 is a microscopic photograph of a media fiber structure at a focal depth in accordance with an implementation of the present disclosure.
Figure 8:
FIG. 8 is a microscopic photograph of a media fiber structure at a focal depth in accordance with an implementation of the present disclosure.
Figure 9:
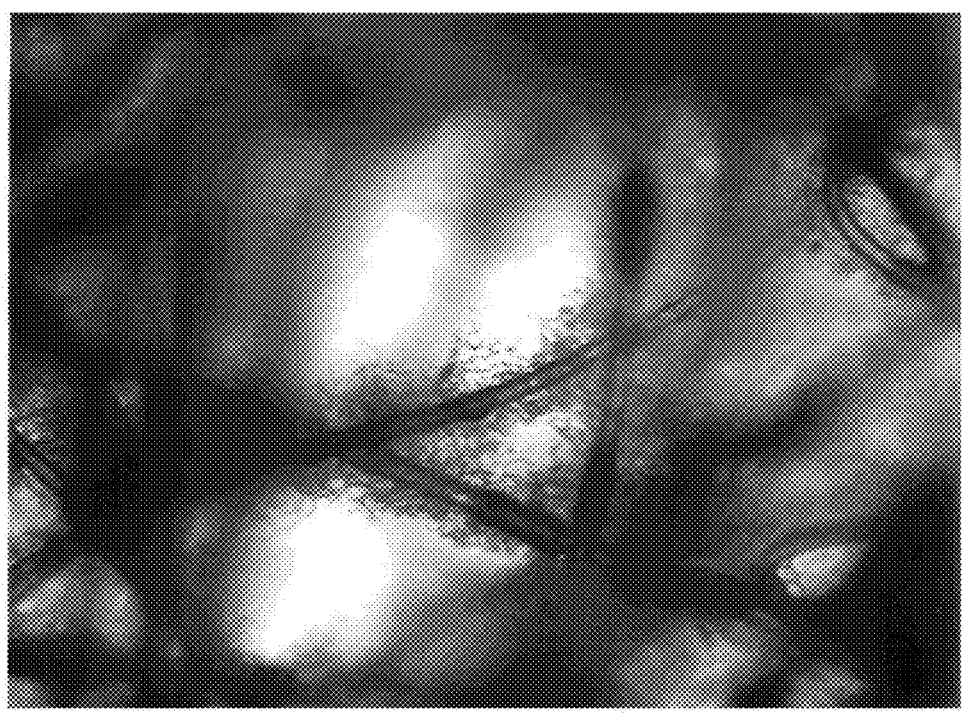
FIG. 9 is a microscopic photograph of a media fiber structure at a focal depth in accordance with an implementation of the present disclosure.
Figure 11:
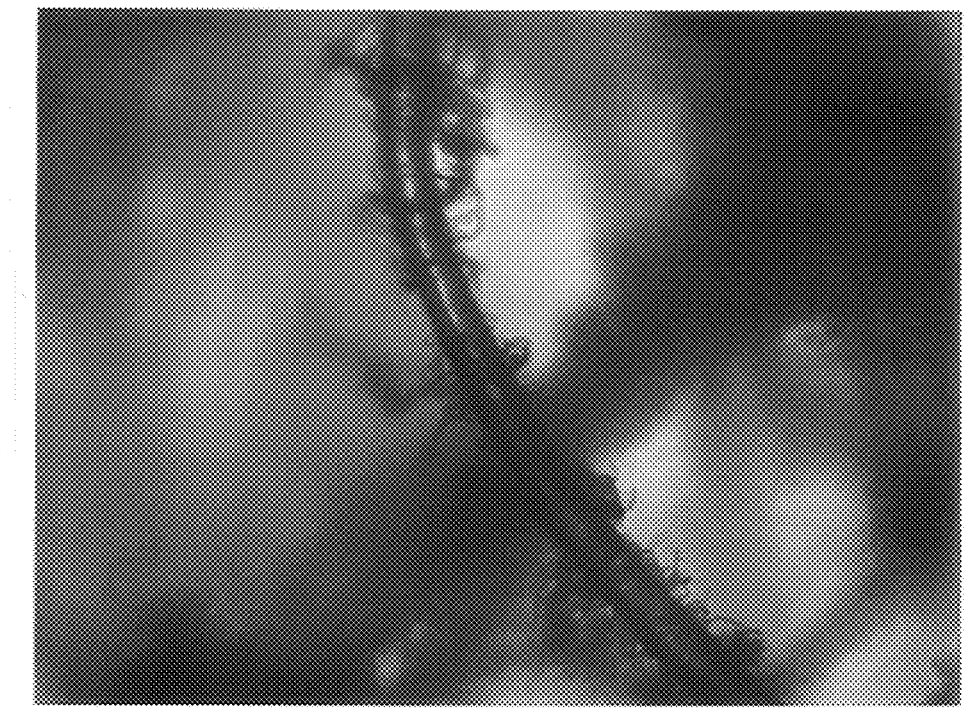
FIG. 11 is a microscopic photograph of a media fiber structure at a focal depth in accordance with an implementation of the present disclosure.
Figure 12:
FIG. 12 is a microscopic photograph of a media fiber structure at a focal depth in accordance with an implementation of the present disclosure.
Figure 13:
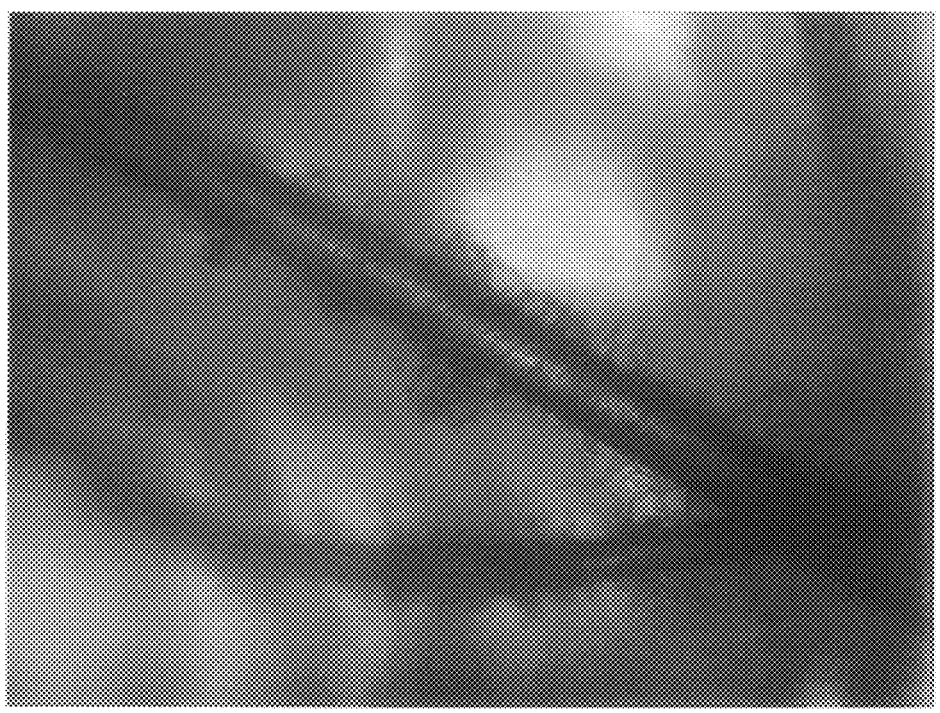
FIG. 13 is a microscopic photograph of a media fiber structure at a focal depth in accordance with an implementation of the present disclosure.

"Straightened Length" is the length from one end of a fiber to the other end of the same fiber when the fiber is measured in a restrained manner under sufficient tensile loading to eliminate the crimp from the fiber. FIG. 4 provides a pictorial representation of a straightened length ($D_2$) of a nano-fiber.

"Crimp Percent" is the ratio of the "crimped length" of a fiber compared to the "Straightened Length" of a fiber presented as a percent. To determine "Crimp Percent" divide the "Crimped Length" of a fiber by the "Straightened Length" of a fiber and multiply by 100.

"High Loft Media" is a three-dimensional stabilized fibrous matrix in sheet form having significantly more air than fiber solids measured on a volume basis; furthermore having a length and a width, and a thickness measured perpendicular to the plane established by the measurement of width and length; the thickness being greater than the diameter of the micron fibers from which the media is made but less than five inches, the media utilized to remove gaseous, liquid, or solid contaminates from a fluid stream.

"Micro-volume" is a three-dimensional space, defined by the nano-fibers of this disclosure. Furthermore, the nano-fibers simultaneously forming micro-pores arranged randomly on, in, and throughout the micro-volumes.

Example Implementations

In FIG. 1, the example fiber structure or substrate is a ½ inch thick high loft pad made from 6 denier fibers. The numeral 10 refers to the high loft fiber structure of this disclosure wherein nano-fibers 12 are attached to and entangled about the larger micron fibers 14. The primary difference between FIG. 1 and FIG. 2 is that a larger amount of nano-fibers 12 are attached to the micron fibers 14 in FIG. 2 as compared to FIG. 1.

Figure 2:
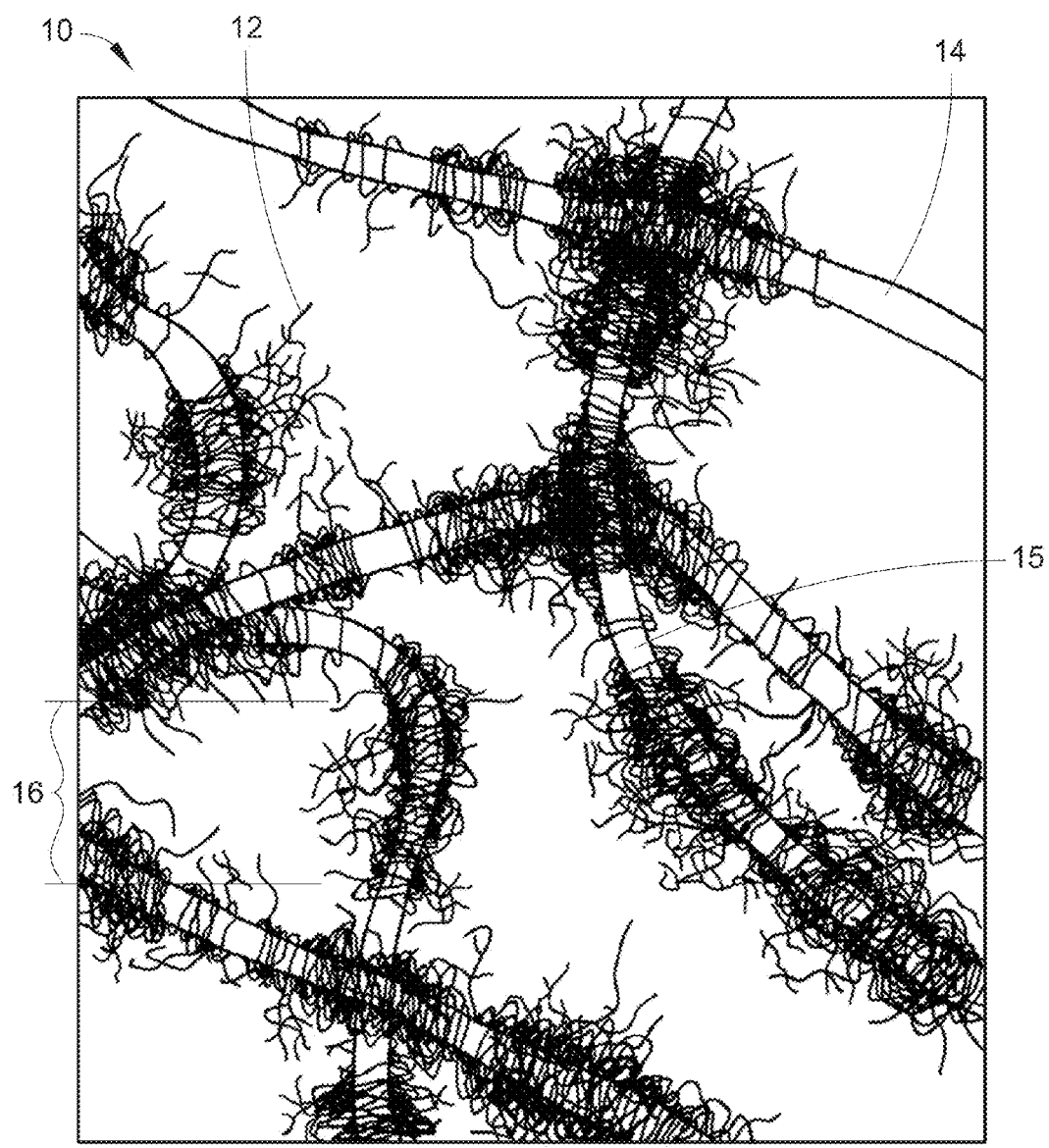
FIG. 2 is a drawing of a microscopic photo of a media fiber structure in accordance with another implementation of the present disclosure.

As seen in FIGS. 1 and 2, the nano-fibers 12 are entangled among themselves as well as attached to and entangle about the larger micron fibers 14 of the high loft filter media. In addition, the nano-fibers extend into the pores formed by the micron fibers 14 of the high loft media.

FIGS. 1 and 2 illustrate, under magnification, the novel construction of the current disclosure wherein large fibers 14 of a traditional filter media have been augmented by the attachment of nano-fibers 12. As is seen in the drawings, the nano-fibers 12 have affixed themselves to the larger fibers 14 as individual nano-fibers 12 and as small entangled tufts 16 of nano-fibers. These tufts also show the micro-volumes formed three-dimensionally by the entanglement of nano-fibers. Microscopic photographs of media fiber structures at various focal depths are provided in FIGS. 5 through 13, where the images illustrate micron fibers having attached nano-fibers arranged in the typical fiber structures of the media. The microscopic photographs further illustrate the micro-volumes formed by the entangled nano-fibers.

FIG. 2 also shows different sizes of fibers made into the novel fiber structure in a media. There are, for the sake of simplicity, three fiber sizes: large 14, medium 15, and small 12. All these fibers may be synthetic or non-synthetic materials. In general, the large and medium fibers are made to provide the structural strength of the media and the small fibers are made to attach to the large and medium fibers. The large and medium fibers used in a filtration media have diameters that may range from 2-1000 microns and their length may be in the order of one half to three inches. The diameter of the smaller fibers may range from 0.001-2 microns. In order to design a filter media with optimum performance, the small fiber should be selected appropriately. It has been found that the small fiber should be smaller than one-tenth of the diameter of the fiber to which it attaches. For example, if the large or medium fiber diameter is 20 microns, the small fibers attaching to it should be 2 microns or smaller. The length selection of the small fiber is related to the size of the pores formed by the large and medium fibers. First, the small fibers should have a length such that when crimped they attach to and entangle with each other about and around the diameter and along the length of the large and medium size fibers. Second, the length of the entangled small fibers should be such as to extend appropriately into the spaces of the pores formed by the large and medium fibers. If the small fibers are not crimped and are too long, they will form webs over the large fibers, which results in high pressure drop and low particle (e.g., dust) holding capacity. Therefore, in order to construct the fiber structures described herein, the extension of the small fibers into the opening should not be longer than half the distance across the average size of pores. For example, if the average size of pores formed by the large and medium fibers is 1000 microns, then the extension of small fibers should be about 500 microns. It should be mentioned that the small fibers to be distributed in the media can be a composition of fibers with various diameters and lengths.

In implementations, a media composed of micron fibers 14, 15 augmented by nano-sized fibers 12 permits capture by micron fibers 14, 15 and the nano-fibers 12 of particles similar to the sizes of the capturing fibers. For example, the nano-fibers 12 extend out into the openings between large fibers 14, 15 effectively increasing the particle capturing efficiency by diffusion, interception and impaction with only minimal increase in pressure drop. The micro-volumes created by the entanglement of nano-fibers provide holding space for small captured particles, hence increasing the dust holding capacity of the filtration media. The extension of the nano-fibers 12 into the pores of a media formed by micron fibers 14, 15 is three-dimensional. This means the amount of surface area and the number of micro-volumes has increased substantially as compared to the surface area and pores created by a two-dimensional nano-fiber web. The fiber structures described herein can be made into a filter media. In implementations, the filter media can be enhanced by the addition of adhesives (e.g., tackifiers), further enhancing the capturing efficiency with insignificant increase in pressure drop. The filter media retains structural strength, low material and manufacturing cost, durability, ease and flexibility of use, and so forth. The substantial amount of surface area and micro-volumes formed by the micron-size and nano-fibers can greatly improve the adsorption, absorption, and repellence of liquids. The substantial amount of surface area and huge number of micro-volumes formed by the micron fibers and nano-fibers can increase the capacity to retain and/or coalesce liquids.

In implementations, functional nano-particles are attached to the modified fiber structure (i.e., a filter media comprising micron-sized fibers with nano-fibers attached thereto). The functional nano-particles can include, for example, activated carbon deposited onto and/or attached to the modified fiber structure. The increased capacity for attachment of nano-particles such as activated carbon onto the micron fibers and nano-fibers can improve the gas absorption efficiency of the fibers due to the substantial increase in surface area throughout the whole media without significant increase in pressure drop.

In implementations, a filter media described herein is configured as a high loft media. The combination of novel fiber structure and high loft media of this disclosure provides a new type of filtration media which has high collection efficiency, low pressure drop, and high dust holding capacity that is easily adapted to existing manufacturing methods, products and applications and installations.

The raw nano-fibers can be produced in several forms. In one form, the nano-fiber may be produced as long separated fibers. In this form, nano-fibers can be cut and crimped to obtain the desired length to diameter ratio. Another form of raw nano-fiber may consist of ground or milled pre-crimped nano-fibers dispersed in a liquid, which in a particular implementation is water. The nano-fiber and liquid mixture may be applied to micron fibers by liquid spray equipment. In addition, the crimped nano-fiber and liquid mixture may be used to make filter media using a wet laid process. Another form of the raw nano-fiber is dry clumps or chunks which are an aggregation of nano-fibers. Grinding may be utilized to reduce the size of the nano-fiber clumps prior to further processing to extract individual crimped nano-fibers for attaching to micron fibers of filter media.

Methods for producing the product of the current disclosure include, but are not limited to:

(1) Affixing the crimped nano-fibers 12 to the micron fibers 14, 15 during the process of producing the micron fiber 14, 15, (2) Attaching the crimped nano-fibers 12 to the micron fibers 14, 15 after the micron fibers are produced, (3) Attaching the crimped nano-fibers 12 to the micron fibers 14, 15 during the production of the filtration media 10, (4) Treating the filtration media 10 with crimped nano-fibers 12 after the filtration media 10 is manufactured.

In one or more methods described herein, the crimped nano-fibers 12 attach themselves to the larger fibers 14 and 15 of the filtration media 10 via one or more of entanglement, adhesion, electrostatic charge, and van der Waals forces (i.e., generally describing the naturally occurring forces of physical attraction between small bodies), and the like. Crimped nano-fibers being small in diameter and relatively longer can easily entangle between themselves and onto the large micron fibers, as observed under a microscope. It should be noted that based on the method or methods chosen from the above production methods, the nano-fibers can be attached to all micron fibers or at specific depths or even to specific areas within the filtration media. In other words, the present disclosure provides for a filter media that is enhanced by nano-fibers in three dimensions (i.e. volumetric) as compared to filter media that is enhanced by nano-fiber web in two dimensions only (i.e., planar).

The attractive forces between the crimped nano-fibers 12 and the large micron fibers 14, 15 can be enhanced by electrostatically charging the dry nano-fibers 12, the filtration media 10, or both, during manufacturing. The electrostatic charging can occur, for example, by triboelectric charging, corona discharging, or other charging methods. Once the fibers touch each other, Van der Waals force comes into play, which further enhances the binding between fibers.

The adhering forces between the crimped nano-fibers 12 and the larger micron fibers 14, 15 can further be enhanced by coating them with an adhesive material (e.g., a tackifier) to provide a glue-like adhering force between the fibers.

The actions of adding tackifier and electrostatic charging not only serve to improve the attachment of the crimped nano-fiber 12 to the micron fiber 14 but further improve the filtration efficiency of the media therefore, even though the crimped nano-fiber 12 attaches satisfactorily to the micron fiber 14 without tackifier and electrostatic charging, tackifier and electrostatic charging can be applied during the filtration media manufacturing process simply to improve the filtration capability of the media.

It should be noted that the physical state of crimped nano-fiber 12 during the process of attaching to the larger filter fibers 14, 15 can be wet or dry. In addition, the final state of the crimped nano-fibers 12 in the fiber structures described herein can be wet or dry.

For liquid absorption, adsorption, or coalescence, the micron fibers and nano-fibers can be selectively made of hydrophilic or hydrophobic materials. The effective pore (i.e., micro-volume) size of the final filtration media can be controlled by selecting the appropriate sizes and combinations of the micron and crimped nano-fibers provides for even further refinement of the ability of the filter media to retain or repel liquids.

In implementations, fiber structures described herein are configured as a gradient density media in which the pore size decreases from the upstream to downstream to increase capture efficiency and dust holding capacity. Such a configuration allows for the application of various sizes and/or amounts of nano-fibers to the media at different depths from the upstream side. In other words, the upstream side of the media has lightest amount and/or largest size of attached nano-fibers while the downstream side has the heaviest amount and/or smallest size of attached nano-fibers. Additionally, desired pore (i.e., micro-volume) sizes can be designed by stacking together layers of media to make a composite media in which each layer has a different amount and/or different size of nano-fibers.

Although the subject matter has been described in language that is specific to certain structures and methodological steps, it is to be understood that the subject matter defined in the appended claims is not necessarily limited to the specific structures and/or steps described. Rather, the specific features and acts described are disclosed as example forms of implementing the claims.

What is claimed is:

1. A fiber structure, having an upstream side and a downstream side, comprising:
    a plurality of micron-sized fibers, each micron-sized fiber comprising a body having a diameter of at least one micron; and
    a plurality of discrete length crimped nano-fibers attached to respective ones of the bodies of the plurality of micron-sized fibers, the plurality of discrete length crimped nano-fibers extending into at least one pore defined between respective ones of the plurality of micron-sized fibers for a distance not longer than half a distance across an average size of the at least one pore.

2. The fiber structure of claim 1, wherein the diameter of the plurality of micron-sized fibers is from about 2 microns to about 1000 microns.

3. The fiber structure of claim 1, wherein the plurality of discrete length crimped nano-fibers have a diameter of from about 0.001 microns to about 2 microns.

4. The fiber structure of claim 1, wherein the plurality of discrete length crimped nano-fibers entangle themselves to form micro-volumes.

5. The fiber structure of claim 1, wherein the plurality of discrete length crimped nano-fibers extend into pores formed by the plurality of micron-sized fibers.

6. The fiber structure of claim 1, wherein a distribution of the plurality of discrete length crimped nano-fibers increases from the upstream side to the downstream side of the fiber structure.

7. The fiber structure of claim 1, wherein a diameter of the plurality of discrete length crimped nano-fibers decreases from the upstream side to the downstream side of the fiber structure.

8. A filter media, comprising:
    a plurality of micron-sized fibers, each micron-size fiber comprising a body having a diameter of at least one micron, respective ones of the plurality of micron-sized fibers defining at least one pore between the micron-sized fibers; and
    a plurality of discrete length, crimped nano-fibers attached to respective ones of the bodies of the micron-sized fibers and extending outwardly from the micron-sized fibers into the at least one pore formed between the micron-size fibers for a distance not longer than half a distance across an average size of the at least one pore.

9. The filter media of claim 8 wherein the nano-fibers entangle upon themselves to form one or more micro-volumes and one or more three-dimensional arranged micro-pores.

10. The filter media of claim 8, further comprising an adhesive on one or more of the plurality of micron-sized fibers and the plurality of discrete length, crimped nano-fibers.

11. The filter media of claim 8, further comprising one or more functional nano-particles attached to one or more of the plurality of micron-sized fibers and the plurality of discrete length, crimped nano-fibers.

12. The filter media of claim 11, wherein the one or more functional nano-particles include activated carbon.

13. The filter media of claim 8, wherein one or more of the plurality of micron-sized fibers and the plurality of discrete length, crimped nano-fibers comprises electrostatic material.

14. The filter media of claim 8, wherein one or more of the plurality of micron-sized fibers and the plurality of discrete length, crimped nano-fibers includes a hydrophobic material.

15. The filter media of claim 8, wherein one or more of the plurality of micron-sized fibers or and the plurality of discrete length, crimped nano-fibers includes a hydrophilic material.

16. The filter media of claim 8, wherein a distribution of the plurality of discrete length, crimped nano-fibers increases from an upstream side to a downstream side of the filter media.

17. The filter media of claim 8, wherein a diameter of the plurality of discrete length, crimped nano-fibers decreases from an upstream side to a downstream side of the filter media.

18. A filter media structure, comprising:
    a plurality of layers, each layer of the plurality of layers including:
        a plurality of micron-sized fibers, each micron-size fiber comprising a body having a diameter of at least one micron, respective ones of the plurality of micron-sized fibers defining at least one pore between the micron-sized fibers; and
        a plurality of discrete length, crimped nano-fibers attached to respective ones of the bodies of the micron-sized fibers and extending outwardly from the micron-sized fibers into the at least one pore formed between the micron-size fibers,
    wherein each layer of the plurality of layers includes a differing size of discrete length, crimped nano-fibers than respective ones of the plurality of layers.

19. The filter media structure of claim 18, wherein the plurality of layers are arranged as a high loft filtration media.

20. The filter media structure of claim 18, wherein each layer of the plurality of layers includes a differing amount of discrete length, crimped nano-fibers than respective ones of the plurality of layers.

21. The filter media structure of claim 18, wherein each layer of the plurality of layers includes at least one of a differing pore size or a differing thickness than respective ones of the plurality of layers.

* * * * *